(No Model.)
E. NOPPEL.
APPARATUS FOR REFINING OIL.
No. 437,659.                    Patented Sept. 30, 1890.
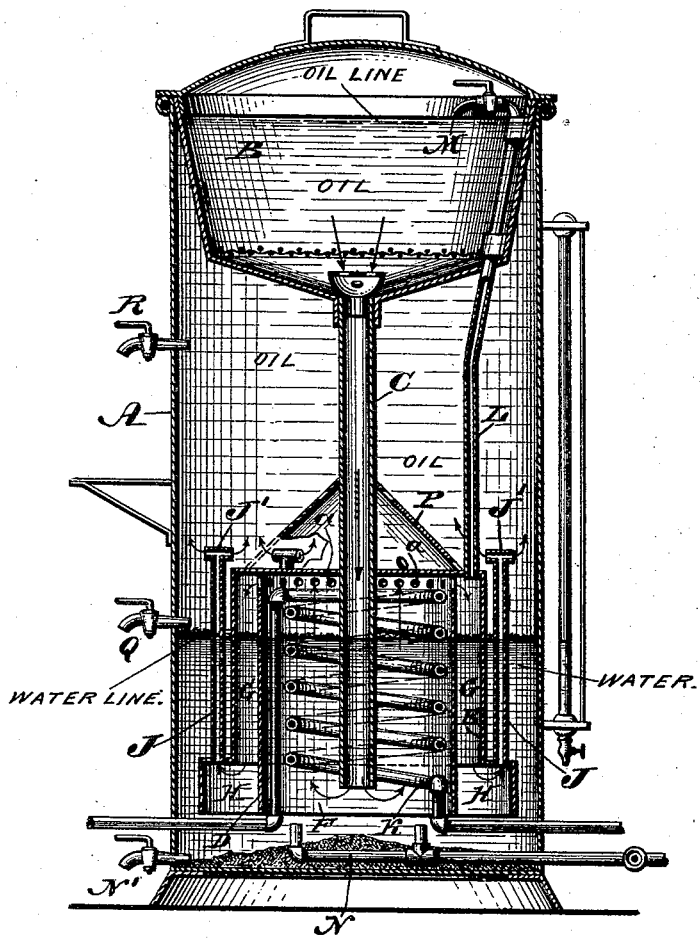
WITNESSES:
L. Douville,
P. F. Cagle.
INVENTOR
Emil Noppel.
BY John A. Diedersheim
ATTORNEY.

United States Patent Office.

EMIL NOPPEL, OF PHILADELPHIA, PENNSYLVANIA, ASSIGNOR OF ONE-HALF TO BRUNO GROSCHÉ, OF NEW YORK, AND JAMES BIGLER, OF NEWBURG, NEW YORK.

APPARATUS FOR REFINING OIL.

SPECIFICATION forming part of Letters Patent No. 437,659, dated September 30, 1890.

Application filed March 11, 1890. Serial No. 343,513. (No model.)

*To all whom it may concern:*

Be it known that I, EMIL NOPPEL, a citizen of the United States, residing in the city and county of Philadelphia, State of Pennsylvania, have invented a new and useful Improvement in Apparatus for Purifying and Refining Oil, which improvement is fully set forth in the following specification and accompanying drawing.

My invention relates to improvements in the apparatus for purifying and refining oil as embodied in the Letters Patent of the United States granted to Christian Dorn and Emil Noppel on the 24th day of September, 1889.

The improvements consist, first, of means for directing foam and gas to the receiving funnel or reservoir.

It further consists of the extension of the heating-pipe above the line of sediment, so that the latter is not disturbed.

It also consists of the discharge-nozzles extending above the line of sediment, so as not to disturb the latter.

It also consists of means for cleaning the apparatus.

The apparatus is more especially designed for purifying and refining waste or refuse oil from journals, steam-engines, lubricators, and machinery generally.

The figure represents a vertical section of an apparatus for purifying and refining oil, embodying my invention.

Referring to the drawing, A designates a tank, within which, at the upper end, is supported a funnel or reservoir B, the latter being provided with a discharge-pipe C, which reaches nearly to the bottom of the tank.

D and E designate cylinders, which are open at bottom and comparatively closed at top and form the chambers F and G, which are partly submerged in the purifying and refining fluid in the tank A. The cylinder D is provided with openings $a$ at its upper end, whereby the chambers F and G are in communication at top. At the bottom of the chamber G is a chamber H, which is open at bottom and in communication with said chamber. Rising from the top wall of said chamber H are pipes J, whose upper ends are provided with nozzles J', which open into the tank A. Within the chamber F is a steam-pipe K, preferably of the form of a coil, the inlet and outlet ends of the same passing through the walls of the tank.

L designates a pipe, which is connected with the top wall of the chamber G and enters the reservoir, its upper end being provided with a cock or faucet M, which opens into said reservoir.

In the lower end of the tank, beneath the chamber H, is a pipe N, which passes through the wall of the tank and is connected with a source of supply of steam, said pipe opening into the tank, so as to direct steam thereinto.

The operation is as follows: The tank is supplied with water or other fluid suitable for purifying or refining oil, and the oil to be purified or refined placed in the funnel B. The oil descends the pipe C and escapes at the bottom of the same. It then rises and enters the chamber F, where it is subjected to the action of the heating-pipe K, so that it is heated, thus reducing the density of the same, causing the impurities thereof to be quickly liberated and precipitated, said impurities falling to the bottom of the tank, where they may be removed through the cock N'. The oil flows from the chamber F, through the perforations $a$, into chamber G, and traversing the latter enters the chamber H, where it reaches the pipes J and rises therein, so as to be discharged through the nozzles J' into the tank, it being noticed that the oil flows through the water or fluid in the several chambers F, G, and H and pipes J whereby it is purified or refined and collected in the tank above the water-line. Should there be any impurities in the column of oil in the tank as treated, they may settle at the bottom of the same and primarily lodge on the water-line, from whence they will drop to the bottom of the tank. The conical deflector P, which is above the top wall of the chamber F, serves to direct sediment or impurities at the base of the column of oil in the tank to the sides of the latter, so that the same may be permitted to precipitate to the bottom of the tank, said deflector being perforated to receive fluid, so as to be prevented from floating and raising the connected parts.

It will be noticed that gas and foam that may be generated in the chamber G, enters the pipe L and is directed by the same to the funnel or reservoir B, so that the gas may escape, and the foam returned to the chamber G, wherein it may be again subjected to purifying and refining action.

The tops of the chambers F G and steam-pipe K, together with the discharge-pipes J, are above the water-line, whereby the sediment or impurities that may collect at the base of the column of oil are not disturbed, said sediment or impurities, when not precipitated, being removable through the cock or faucet Q.

The purified or refined oil may be discharged through the cock or faucet R.

When the apparatus is to be cleansed, steam is admitted into the tank through the pipe N, whereby sediment and impurities are agitated or liberated, and the tank, chamber, &c., are subjected to the action of the steam, thus releasing the deposits therein, after which the cock N' is opened, so that the impurities, &c., may flow or be driven therethrough.

Having thus described my invention, what I claim as new, and desire to secure by Letters Patent, is—

1. In an apparatus for purifying and refining oil, an upper oil-reservoir, a lower chamber, a heating-chamber located in the aforesaid chamber, means, substantially as described, for heating said latter chamber, and a pipe connected to the upper part of said lower chamber and extending up through and to the upper portion of said oil-reservoir, whereby foam and gas may be discharged from said chamber into said reservoir, substantially as described.

2. An apparatus for refining and purifying oil, consisting of a tank, a receiving-reservoir in the upper part of said tank and provided with a discharge-pipe extending to near the bottom of the tank, a heating-chamber through which said discharge-pipe partially extends, a pipe for heating, located within said chamber, chambers G and H, surrounding said heating-chamber, and a foam and gas discharge-pipe connected to the upper part of said chamber G and extending upward through and to the upper portion of the said receiving-reservoir, substantially as described.

3. In an apparatus for purifying oil, a tank, a receiving-reservoir in the upper part of said tank and provided with a discharge-pipe extending to near the bottom of the tank, a heating-chamber through which said discharge-pipe partially extends, a pipe for heating, located within said chamber, chambers G and H, surrounding said heating-chamber, a foam and gas discharge-pipe connected to the upper part of said chamber G and extending upward through and to the upper portion of said receiving-reservoir, and a discharge-pipe J, extending upward from said chamber H, parallel with and above the top of chamber G, and having a top horizontal nozzle J', said parts being combined substantially as described.

4. In an apparatus for purifying and refining oil, a tank, an oil-receiving reservoir in the upper part of said tank, having a depending discharge-pipe, a chamber in the lower part of said tank, means, substantially as described, for heating said chamber, the chambers G H, surrounding and communicating with said heating-chamber, a perforated conical deflector mounted over and connected to said chambers and through which the discharge-pipe passes, and a foam and gas discharging pipe connected to the upper part of the chamber G and extending upward through and to the upper portion of the receiving-reservoir, substantially as and for the purposes set forth.

EMIL NOPPEL.

Witnesses:
JOHN A. WIEDERSHEIM,
A. P. JENNINGS.